Patented June 5, 1945

2,377,395

UNITED STATES PATENT OFFICE 2,377,395

PYRIMIDINE DERIVATIVES AND PROCESS OF PREPARING THE SAME

Hans Andersag and Kurt Westphal, Wuppertal-Elberfeld, Germany, assignors to Winthrop Chemical Company, Inc., New York, N. Y., a corporation of New York No Drawing. Application December 30, 1936, Serial No. 118,261. In Germany January 28, 1936

8 Claims. (Cl. 260—251)

This invention relates to certain pyrimidine derivatives and to processes of preparing the same.

It is the object of this invention to produce pyrimidine derivatives which in accordance with our invention are of great importance in the synthesis of vitamin $B_1$ and related substances. According to our idea of the chemical structure of vitamin $B_1$ which is known by its antineuritic activity (compare our copending application Serial No. 118,260 for Letters Patent filed December 30, 1936), but contrary to the suggestions of other investigators pyrimidine derivatives of the general formula:

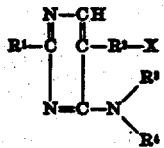

are required for the production of compounds of a chemical constitution like or similar to the chemical structure of vitamin $B_1$ and related substances. In this formula $R^1$ stands for alkyl, aryl or aralkyl groups, $R^2$ stands for an aliphatic radical, $R^3$ and $R^4$ stand for hydrogen or alkyl and X stands for a reactive group such as halogen, hydroxyl, —O—CO—R and —O—SO$_2$R, R being an organic radical. After having succeeded in the manufacture of such formerly unknown pyrimidine derivatives, we indeed were able to prepare vitamin $B_1$ and related substances from the said pyrimidine derivatives by chemical synthesis, the vitamin $B_1$ itself being obtained by starting with pyrimidines of the formula:

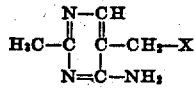

wherein X has the same meaning as indicated above.

In accordance with the present invention the pyrimidine derivatives above specified are obtainable by reacting upon compounds of the formula

with an amidine of an alkyl, aryl or aralkyl carboxylic acid. In the said formula R stands for an aliphatic radical, preferably for an alkylene group, for instance, for the methylene, ethylene, propylene and beta-hydroxypropylene group, $Z^1$ and $Z^2$ which are attached to the same carbon atom of R stand for cyano, hydroxymethylene and etherified hydroxymethylene groups, furthermore for carbonyl groups the carbon atom of which is substituted by hydrogen (formyl group), alkoxy, aryloxy and aralkoxy groups (carboxylic ester groups), halogen atoms or amino groups (carboxylic acid halide and amide groups), and Y stands for a reactive group as defined above for X or for a group which is convertible into one of the groups standing for X; such groups are, for instance, carboxylic acid ester groups which are reduced to hydroxyl groups or are converted into corresponding acid amide or hydrazide groups. The latter groups which themselves may also stand for Y are transformed into amino groups according to Hoffmann's reaction, Curtius' reaction respectively. An acid-amide group may also be dehydrated to form the cyano group; the cyano group may itself stand for Y; it is reduced to the $H_2N$—$CH_2$—group. An acid amid group may also directly be reduced to the $H_2N$—$CH_2$— group. Also etherified hydroxyl groups that is alkoxy, aralkoxy and aryloxy groups may stand for Y. They are split off by hydrohalic acids to yield halogen groups.

Depending on the kind of group representing $Z^1$ and $Z^2$ pyrimidines are obtained containing in the 4- and 6-positions hydrogen atoms, hydroxyl or amino groups. Hydrogen atoms result from the reaction of the hydroxymethelene or etherified hydroxymethylene group, hydroxyl groups from the reaction of carboxylic acid ester, -halide and -amide groups and amino groups from the reaction of cyano groups. Hydroxyl groups are subsequently transformed as desired into hydrogen or into the amino group, preferably by first replacing them by halogen, for instance, by means of a phosphorus halide, preferably phosphorus oxyhalide and then replacing the halogen atom by hydrogen or an amino group under the action of hydrogen or ammonia, a primary or a secondary amine. If both, the 4- and 6-positions are substituted by amino groups one of them is subsequently replaced by hydrogen by means of careful treatment with nitrous acid and alcohol.

The reactions mentioned before may be described in more detail as follows:

Amidines of organic carboxylic acids are condensed, for instance, with compounds of the formula

wherein R stands for an alkylene group, $Z^1$ stands for a carboxylic acid ester group, $Z^2$ stands for a formyl group or the tautomeric hydroxymethylene group or for an etherified hydroxy methylene, and Y stands for one of the groups above specified. Compounds of the said formula are acetic acid esters, for instance, of the formula

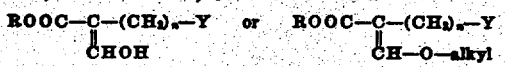

(n standing for a whole number.) The said condensation is preferably carried out in the presence of solvents or diluents and at ordinary or elevated temprature; generally condensing agents are added, preferably acid-binding agents, for instance, the alcoholates, carbonates and hydroxides of metals and like compounds. The acetic ester compounds may also be employed in the form of their metal compounds. 2-Alkyl-(aryl, aralkyl)-4-hydroxypyrimidines substituted in the 5-position by the substituent —(CH₂)—Y are primarily obtained in this condensation. The most convenient way to convert the 4-hydroxy group into the amino group is by substituting the hydroxyl group by a halogen atom, for instance, by means of a halide of phosphorus and replacing the halogen atom by a substituted or non-substituted amino group by treatment with ammonia or a pr'mary or secondary amine.

When reacting for instance upon acetamidine with an alpha-hydroxymethylene-succinic acid-dialkylester, the reaction proceeds in accordance with the following reaction scheme:

In accordance with a still further feature of the present invention the 5-halogen alkyl compounds are also obtainable from the 4-amino-5-aminoalkyl-pyrimidine compounds. We have found that when reacting upon the said compounds with nitrous acid only the amino group in the 5-aminoalkyl-radical is attacked. It is therefore possible when starting with 4-amino-5-aminoalkyl-pyrimidines or their salts to obtain readily the 4-amino-5-hydroxyalkyl-pyrimidines and the esters of the said hydroxy compounds. It is possible to obtain the esters by esterification of the 4-amino-5-hydroxyalkyl-pyrimidine compounds first formed, for instance, by the action of acids, acid anhydrides or also acid halides. Hydrohalic acid esters are in particular also obtained by the action of the halides of phophorus and of halides of sulphurous acids, for instance thionyl chloride. Furthermore the esters may also be obtained directly from the 4 - amino - 5 - aminoalkyl-pyrimidine compounds by reacting with nitrite in the presence of excess concentrated acid, particularly hydrohalic acid.

The above described behaviour of the 4-amino-5-aminoalkyl-pyrimidines to nitrite is surprising. For, since in 4-amino-5-alkyl-pyrimidines the amino group is exchanged for the hydroxyl group by the action of nitrous acid (compare Meyer-Jacobson "Lehrbuch der organischen Chemie" vol. II, 3rd part, page 1179, paragraph

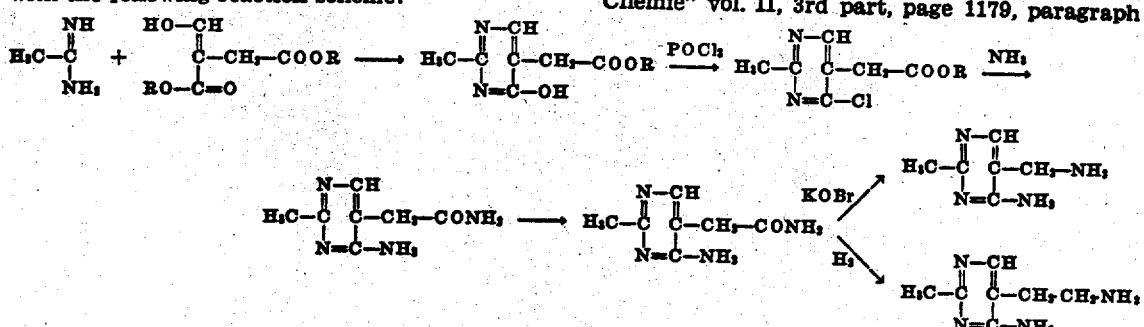

The reaction may also be carried out by using cyano-acetic esters which contain a carboxylic acid ester group, such compounds having the formula

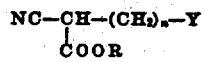

In this case the pyrimidine derivatives primarily formed contain in the 6-position a hydroxyl group which subsequently is replaced by hydrogen. When using, for instance, acetamidine and cyano succinic acid ester (Z² and Y each being represented by the carboxylic acid ester group), first a 4-amino-6-hydroxy pyrimidine derivative is obtained the 6-hydroxyl group of which is subsequently converted into hydrogen. The reactions proceed in the following manner:

1) it was to be expected that in this case also the amino group standing in 4-position would react with the nitrite. On the other hand, because of the known reactions of nitrous acid with compounds which contain an amino and an aminoalkyl group in a grouping similar to that of 4-amino-5-aminoalkyl-pyrimidines, it was to be expected that by the action of nitrite upon 4-amino-5-aminoalkyl-pyrimidines 1,2,3-triazine compounds would be obtained (loc. cit. page 1509 et seq.).

The invention is further illustrated by the following examples, but is not limited thereto:

*Example 1*

128 g. of acetamidine hydrochloride and 269 g. of formyl-succinic acid ester are taken up in 200

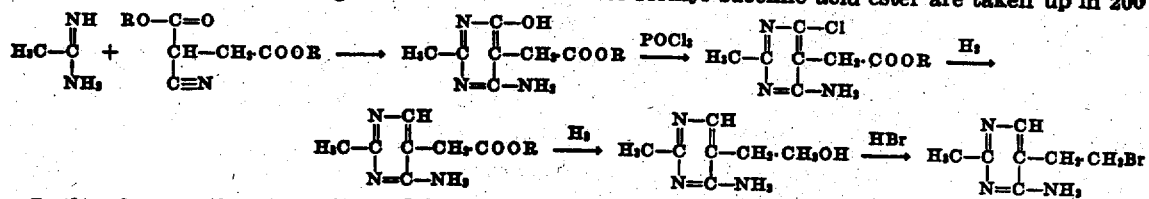

In the aforementioned reaction a 5-halogen alkyl compound is obtained. The 5-halogen alkyl-4-amino-pyrimidines are of particular practical interest as initial materials for the synthesis of vitamin B₁.

ccs. of anhydrous alcohol and boiled with a solution of 32 g. of sodium in 500 ccs. of anhydrous alcohol for six hours. The hot solution is filtered off from the separated sodium chloride. On cooling, colourless needles of the 2-methyl-4-hydroxy-pyrimidyl-5-acetic ester of melting point 176° C. are separated from the solution. 100 g. of this compound are boiled for half an hour with 400 ccs. of phosphorus oxychloride. The excess of the phosphorus oxychloride is then distilled off under reduced pressure, and the residue decomposed by means of ice water. The acid solution is rendered alkaline with ammonia and shaken with ether several times. The ethereal solution is dried and evaporated. The residue boils at 110° C. under 4 mm. pressure. The distillate solidifies to a crystalline magma and melts at 40–41° C. It is the 2-methyl-4-chloropyrimidyl-5-acetic ester.

45 g. of this compound are heated for ten hours with 380 ccs. of 25% methylalcoholic ammonia in an autoclave to 120–130° C. After allowing to cool, the separated crystals are filtered with suction and recrystallized from aqueous alcohol. The 2-methyl-4-amino-pyrimidyl-5-acetic acid amide obtained forms colourless needles which melt at 250° C. 16.6 g. of this compound are dissolved in a solution of 16 g. of bromine in 200 ccs. of 2.5-normal-potassium hydroxide solution. 50 ccs. of 50% potassium hydroxide solution are added. After cooling, the solution is shaken with ether, the ethereal solution dried and freed from the ether. The residue sublimes in vacuo in firm rhomba which melt at 132° C. The crystals are the 2-methyl-4-amino-5-aminomethyl-pyrimidine. The picrate melts at 224–225° C.; the hydrochloride melts at 268° C. with decomposition.

The same compound can also be obtained from the 2-methyl-4-hydroxypyrimidyl-5-acetic acid ethyl ester by way of the 5-acetic acid hydrazide by converting the hydrazide according to the Curtius reaction into the 5-aminomethyl compound and then converting the hydroxyl group in the 4-position into an amino group in the manner indicated above.

When using instead of acetamidine hydrochloride the equivalent quantity of propioamidine hydrochloride and working otherwise as described above, first the 2-ethyl-4-hydroxypyrimidyl-5-acetic ester melting at 164° C. is obtained. It is converted into the 2-ethyl-4-chloropyrimidyl-5-acetic ester boiling under 2 mm. pressure at 126–127° C. and the latter into the 2-ethyl-4-amino-pyrimidyl-5-acetamide melting at 236° C. From the latter the hydrochloride of the 2-ethyl-4-amino-5-aminomethyl-pyrimidine is obtained in colorless crystals melting at 248°–250° C. with decomposition.

The 5-aminoalkyl compounds may be transformed into 5-halogenalkyl compounds in the following manner:

63.4 g. of 2-methyl-4-amino-5-aminomethyl-pyrimidine-hydrochloride are dissolved in 600 ccs. of water at 50–60° C. At this temperature a solution of 22 g. of sodium nitrite in 200 ccs. of water is added drop by drop. The mixture is heated for 2 hours to 50–60° C., 45 g. of anhydrous sodium carbonate are added and the mixture is evaporated to dryness under reduced pressure. The pulverized residue is extracted with acetone while hot. On evaporating the acetone the 2-methyl-4-amino-5-hydroxymethyl-pyrimidine is obtained in colourless crystals which melt at 191° C. 20 g. of the said compound are dissolved in 300 ccs. of glacial acetic acid and hydrobromic acid is introduced into the solution. Thereby the temperature rises to 60° C. The hydrobromide of the alcohol first precipitated dissolves and the hydrobromide of the 2-methyl-4-amino-5-bromomethyl-pyrimidine separates gradually in thin crystals. The crystals are filtered with suction and washed with glacial acetic acid and ether. They melt at 208° C. with decomposition.

From the above mentioned 5-hydroxymethyl compound the benzene sulphonic acid ester is obtained as follows:

13.9 g. of 2-methyl-4-amino-5-hydroxymethyl-pyrimidine are finely powdered and heated with 20 g. of benzene sulphochloride during 1 hour to 100° C. The reaction product is treated with ether. The yellowish colored powder is the hydrochloride of the benzene sulfonic acid ester of 2-methyl-4-amino-5-hydroxymethyl-pyrimidine.

The 5-chloromethyl compound is obtained as follows:

21.1 g. of 2-methyl-4-amino-5-aminomethyl-pyrimidine hydrochloride are suspended in a finely pulverised form in 300 ccs. of concentrated hydrochloric acid and treated with a concentrated aqueous solution of 7 g. of sodium nitrite at 40–50° C. The mixture is heated to 40–50° C. until the evolution of nitrogen is complete, poured into ice water, ether is poured over and the aqueous liquid rendered alkaline with potassium carbonate solution while stirring and well cooling. After repeated extraction with ether and evaporation of the solvent the 2-methyl-4-amino-5-chloromethyl-pyrimidine remains in the form of colorless crystals which melt at 163° C.

The same compound may also be obtained in the following manner:

5 g. of 2-methyl-4-amino-5-hydroxymethyl-pyrimidine are intimately triturated under 50 ccs. of chloroform with 8 g. of phosphorus pentachloride. The mixture is heated to boiling for 1 hour while stirring. After the chloroform and the phosphorus oxychloride formed have evaporated the hydrochloride of 2-methyl-4-amino-5-chloromethyl-pyrimidine remains which is transformed into the free base by means of cold potassium carbonate solution.

*Example 2*

216 grams of formyl glutaric acid ester, boiling at 115° C. under 3 mm. pressure, copper salt melting at 125° C., are condensed with 96 grams of acetamidine hydrochloride in a solution of 23 grams of sodium in 1 liter of absolute alcohol. The 2-methyl-4-hydroxy-pyrimidine-5-propionic acid ethylester formed melts at 111° C.

With phosphorus oxychloride the 4-chloro-compound boiling at 130–131° C. under 4 mm. pressure is obtained in accordance with the method described in Example 1. On heating to 120° C. with methylalcoholic ammonia in a closed pressure vessel a mixture is formed from which with dilute caustic soda lye a by-product melting at 243° C. which has not been examined may be separated. The undissolved part is the 2-methyl-4-amino-pyrimidyl-5-propionic acid amide melting at 195–200° C. Therefrom by Hoffmann's decomposition (compare the reaction conditions in Example 1) the 2-methyl-4-amino-5-(β-aminoethyl)-pyrimidine is obtained. The hydrochloric acid salt melts at 264° C., its picrate at 229° C.

*Example 3*

23 grams of sodium are dissolved in 2 liters of absolute alcohol and boiled together with 202 grams of formyl-succinic acid ester and 170 grams of the hydrochloride of phenylacetamidine for 6 hours. After cooling in ice water the crystals are filtered with suction and dissolved in caustic soda solution. From this solution white crystals melting at 175° C. are obtained. The product is the 2-benzyl-4-hydroxy-pyrimidine-5-acetic ester.

190 grams of the said substance are boiled with 500 ccs. phosphorus oxychloride for 4 hours. The clear solution is freed from excess phosphorus oxychloride under reduced pressure and the residue decomposed with ice water. The aqueous solution is neutralized with sodium acetate and three times extracted with ether. The ethereal solution is extracted with caustic soda solution until the reaction is rendered alkaline, washed with water and dried over sodium sulfate. After the ether has evaporated an oil remains which boils under 3 mm. pressure at 188° C. It is the 2-benzyl-4-chloropyrimidine-5-acetic ester.

50 grams of the said substance are heated with 500 ccs. of saturated methyl alcoholic ammonia for 5 hours in an autoclave to 100° C. After cooling the crystals separating are filtered with suction and recrystallized from alcohol. In this manner the 2-benzyl-4-aminopyrimidine-5-acetamide is obtained in white crystals which melt at 239° C.

24.2 grams of the said substance are dissolved in a stirring apparatus in 5 liters of water while hot and the solution cooled to 5° C. Within one hour a solution of 16 grams of bromine in 224 ccs. of 10% potassium hydroxide solution is added drop by drop and the mixture kept for 4 hours at this temperature. It is then heated for one hour on the boiling water bath. After cooling to 20° C. the mixture is stirred with 20 grams of benzaldehyde and 50 ccs. of ether for 5 hours. Thereupon crystals separate which are filtered with suction and washed with ether. The benzaldehyde compound is suspended in normal hydrochloric acid and distilled with steam until all benzaldehyde has distilled over. The aqueous clear solution is evaporated to dryness under reduced pressure and the crystalline residue dissolved in alcohol and precipitated with ether. In this manner crystals of the hydrochloric acid salt of 2-benzyl-4-aminopyrimidyl-5-methylamine melting at 261° C. with decomposition are obtained.

Example 4

31 grams of 2-phenyl-4-amino-5-amino-methyl-pyrimidine-dihydrochloride are dissolved in 60 ccs. of water and heated to 50–60° C. while stirring. Within one hour a solution of 8 grams of sodium nitrite in 100 ccs. of water is added drop by drop and the content of the vessel kept for further 2 hours at 60° C. Then the turbid solution is rendered alkaline with sodium carbonate and extracted with methylene chloride. The combined methylene extracts are extracted with dilute hydrochloric acid and the hydrochloric acid solution neutralized with sodium acetate. It is extracted with methylene chloride several times. After the methylene chloride has evaporated an oil remains which gradually solidifies to crystals. It is the 2-phenyl-4-amino-5-hydroxymethylpyrimidine the hydrochloric acid salt of which melts at 199° C. and the picrate of which melts at 177° C.

10 grams of 2-phenyl-4-amino-5-hydroxy-methylpyrimidine-picrate are dissolved in 300 ccs. of glacial acetic acid and dry hydrogen bromide is introduced into the solution at 35° C. until it is saturated. The solution is left standing for 18 hours and treated with ether until crystallization commences. The crystals are filtered with suction and washed with ether. In this manner the 2-phenyl-4-amino-5-bromomethylpyrimi- dine bromohydrate melting at 165° C. is obtained.

Example 5

71 grams of 2-methyl-4-chloro-pyrimidyl-5-acetic ester are heated in an autoclave for 10 hours to 120–130° C. with 650 ccs. of 25% methyl alcoholic methylamine solution. The content is evaporated to dryness and extracted with acetone while hot. On concentrating the 2-methyl-4-dine-bromohydrate melting at 165° C. is obtained. amide is obtained in crystals melting at 156° C.

By saponification with barium hydroxide the 2-methyl-4-methylamino-pyrimidyl-5-acetic acid melting at 217° C. is obtained. Therefrom by boiling with alcoholic hydrochloric acid two compounds, a solid one melting at 111° C., and an oil boiling at 132° C. under 2 mm. pressure are obtained. On treatment with alcoholic ammonia from the two compounds the same 2-methyl-4-methylamino-pyrimidine-5-acetic acid amide is obtained. The latter yields according to the method specified above the 2-methyl-4-methylamino-5-amino-methylpyrimidine boiling at 130° C. under 3 mm. pressure. The hydrochloric acid salt melts at 273° C.

When using in the above example instead of the methyl-alcoholic methylamine solution corresponding solutions of dimethylamine, ethylamine and diethylamine and working otherwise as described above, the 2-methyl-4-dimethylamino- or 4-ethylamino or 4-diethylamino-5-aminomethyl-pyrimidine boiling under 3 mm. pressure at 132°, 135° and 137° C. are obtained.

We claim:

1. The process which comprises reacting with a carboxylic acid amidine upon a compound of the formula:

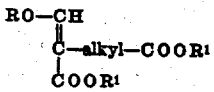

wherein R stands for a substituent selected from the group consisting of hydrogen and alkyl and $R^1$ stands for alkyl, converting in the pyrimidine compound formed the hydroxyl group standing in the 4-position by the action of a phosphorus halide into halogen, replacing the latter by an amino group by the action of ammonia by which simultaneously the carboxylic acid ester group in the substituent of the 5-position of the pyrimidine nucleus is converted into the carboxylic acid amide group, transforming the latter according to Hoffmann's degradation reaction into the amino group and transforming this amino group into hydroxyl by the action of nitrous acid.

2. Process as claimed in claim 1, in which the action of nitrous acid is effected in the presence of excess concentrated hydrohalic acid.

3. The process which comprises reacting with a carboxylic acid amidine upon a compound of the formula:

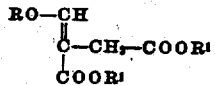

wherein R stands for a substituent selected from the group consisting of hydrogen and alkyl and $R^1$ stands for alkyl, converting in the pyrimidine compound formed the hydroxyl group standing in the 4-position by the action of a phosphorus halide into halogen, replacing the latter by an amino group by the action of ammonia by which simultaneously the carboxylic acid ester group in the substituent of the 5-position of the pyrimidine nucleus is converted into the carboxylic acid amide group, transforming the latter according to Hoffmann's degradation reaction into the amino group and transforming this amino group into hydroxyl by the action of nitrous acid.

4. Process as claimed in claim 3, in which the action of nitrous acid is effected in the presence of excess concentrated hydrohalic acid.

5. The process which comprises reacting with acetamidine upon a compound of the formula

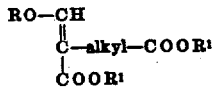

wherein R stands for a substituent selected from the group consisting of hydrogen and alkyl and R¹ stands for alkyl, converting in the pyrimidine compound formed the hydroxyl group standing in the 4-position by the action of a phosphorus halide into halogen, replacing the latter by an amino group by the action of ammonia by which simultaneously the carboxylic acid ester group in the substituent of the 5-position of the pyrimidine nucleus is converted into the carboxylic acid amide group, transforming the latter according to Hoffmann's degradation reaction into the amino group and transforming this amino group into hydroxyl by the action of nitrous acid.

6. Process as claimed in claim 5, in which the action of nitrous acid is effected in the presence of excess concentrated hydrohalic acid.

7. The process which comprises reacting with acetamidine upon a compound of the formula

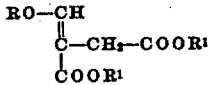

wherein R stands for a substituent selected from the group consisting of hydrogen and alkyl and R¹ stands for alkyl, converting in the pyrimidine compound formed the hydroxyl group standing in the 4-position by the action of a phosphorus halide into halogen, replacing the latter by an amino group by the action of ammonia by which simultaneously the carboxylic acid ester group in the substituent of the 5-position of the pyrimidine nucleus is converted into the carboxylic acid amide group, transforming the latter according to Hoffmann's degradation reaction into the amino group and transforming this amino group into hydroxyl by the action of nitrous acid.

8. Process as claimed in claim 7, in which the action of nitrous acid is effected in the presence of excess concentrated hydrohalic acid.

HANS ANDERSAG.
KURT WESTPHAL.

CERTIFICATE OF CORRECTION.

Patent No. 2,377,395.   June 5, 1945.

HANS ANDERSAG, ET AL.

It is hereby certified that error appears in the printed specification of the above numbered patent requiring correction as follows: Page 2, first column, line 12, for "temprature" read --temperature--; page 3, first column, line 58, Example I, for "63.4" read --63.3--; page 4, second column, line 9, Example 5, strike out "dine-bromohydrate melting at 165° C. is obtained." and insert instead -- methylamino-pyrimidyl-5-acetic acid methyl- --; and that the said Letters Patent should be read with this correction therein that the same may conform to the record of the case in the Patent Office.

Signed and sealed this 2nd day of October, A. D. 1945.

Leslie Frazer
First Assistant Commissioner of Patents.

(Seal)

Hoffmann's degradation reaction into the amino group and transforming this amino group into hydroxyl by the action of nitrous acid.

4. Process as claimed in claim 3, in which the action of nitrous acid is effected in the presence of excess concentrated hydrohalic acid.

5. The process which comprises reacting with acetamidine upon a compound of the formula

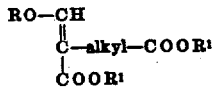

wherein R stands for a substituent selected from the group consisting of hydrogen and alkyl and $R^1$ stands for alkyl, converting in the pyrimidine compound formed the hydroxyl group standing in the 4-position by the action of a phosphorus halide into halogen, replacing the latter by an amino group by the action of ammonia by which simultaneously the carboxylic acid ester group in the substituent of the 5-position of the pyrimidine nucleus is converted into the carboxylic acid amide group, transforming the latter according to Hoffmann's degradation reaction into the amino group and transforming this amino group into hydroxyl by the action of nitrous acid.

6. Process as claimed in claim 5, in which the action of nitrous acid is effected in the presence of excess concentrated hydrohalic acid.

7. The process which comprises reacting with acetamidine upon a compound of the formula

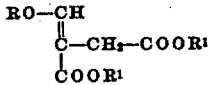

wherein R stands for a substituent selected from the group consisting of hydrogen and alkyl and $R^1$ stands for alkyl, converting in the pyrimidine compound formed the hydroxyl group standing in the 4-position by the action of a phosphorus halide into halogen, replacing the latter by an amino group by the action of ammonia by which simultaneously the carboxylic acid ester group in the substituent of the 5-position of the pyrimidine nucleus is converted into the carboxylic acid amide group, transforming the latter according to Hoffmann's degradation reaction into the amino group and transforming this amino group into hydroxyl by the action of nitrous acid.

8. Process as claimed in claim 7, in which the action of nitrous acid is effected in the presence of excess concentrated hydrohalic acid.

HANS ANDERSAG.
KURT WESTPHAL.

CERTIFICATE OF CORRECTION.

Patent No. 2,377,395.   June 5, 1945.

HANS ANDERSAG, ET AL.

It is hereby certified that error appears in the printed specification of the above numbered patent requiring correction as follows: Page 2, first column, line 12, for "temprature" read --temperature--; page 3, first column, line 58, Example I, for "63.4" read --63.3--; page 4, second column, line 9, Example 5, strike out "dine-bromohydrate melting at 165° C. is obtained." and insert instead -- methylamino-pyrimidyl-5-acetic acid methyl- --; and that the said Letters Patent should be read with this correction therein that the same may conform to the record of the case in the Patent Office.

Signed and sealed this 2nd day of October, A. D. 1945.

Leslie Frazer
First Assistant Commissioner of Patents.

(Seal)